United States Patent [19]
Shaffer et al.

[11] Patent Number: 6,104,788
[45] Date of Patent: Aug. 15, 2000

[54] APPARATUS AND METHOD FOR USING A TELEPHONE FOR REMOTE SCHEDULING

[75] Inventors: Shmuel Shaffer, Palo Alto; William Joseph Beyda, Cupertino, both of Calif.

[73] Assignee: Siemens Information and Communication Networks, Inc., Boca Raton, Fla.

[21] Appl. No.: 08/985,388

[22] Filed: Dec. 4, 1997

[51] Int. Cl.[7] ............................... H04M 3/42; H04L 5/00
[52] U.S. Cl. .................... 379/93.17; 379/93.21; 379/202
[58] Field of Search ................... 704/260, 270, 704/275; 705/8; 379/88.04, 88.13, 74, 93.23, 202, 93.17, 93.21, 209

[56] References Cited

U.S. PATENT DOCUMENTS

| | | | |
|---|---|---|---|
| 4,162,610 | 7/1979 | Levine | 58/148 |
| 4,489,438 | 12/1984 | Hughes | 381/51 |
| 4,548,510 | 10/1985 | Levine | 368/10 |
| 4,626,836 | 12/1986 | Curtis et al. | 340/706 |
| 4,769,796 | 9/1988 | Levine | 368/29 |
| 4,783,800 | 11/1988 | Levine | 379/67 |
| 4,819,191 | 4/1989 | Scully et al. | 364/518 |
| 4,866,611 | 9/1989 | Cree et al. | 364/300 |
| 5,093,813 | 3/1992 | Levine | 368/10 |
| 5,323,314 | 6/1994 | Baber et al. | 364/401 |
| 5,428,678 | 6/1995 | Fitzpatrick et al. | 379/201 |
| 5,742,674 | 4/1998 | Jain et al. | 379/209 |
| 5,825,854 | 10/1998 | Larson et al. | 379/88.13 |
| 5,845,257 | 12/1998 | Fu et al. | 705/8 |
| 5,848,132 | 12/1998 | Morley et al. | 379/209 |
| 5,872,841 | 2/1999 | King et al. | 379/88.13 |
| 5,956,024 | 9/1999 | Strickland et al. | 345/327 |
| 5,974,406 | 10/1999 | Bisdikian et al. | 707/1 |
| 5,991,382 | 11/1999 | Bayless et al. | 379/136 |
| 5,999,525 | 12/1999 | Krishnaswamy et al. | 370/352 |
| 6,009,398 | 12/1999 | Mueller et al. | 704/275 |

Primary Examiner—David R. Hudspeth
Assistant Examiner—Susan Wieland

[57] ABSTRACT

A system and method enabling a user to remotely access an electronic calendar using a telephone network is provided. The system includes the electronic calendar for storing a plurality of schedules and a scheduler for accessing the schedules as a function of input signals received over the telephone network. Each schedule contains future appointments and events for either daily, weekly or other data interval periods. The scheduler enables selective retrieval and display of the appointments and events for any selected time period. The system is coupled to interfaces allowing the schedule information to be transmitted as audio information, video information, or e-mail information. The scheduler can compare the schedules to one another to automatically generate common meeting times. The common meeting time can then be transmitted to the various attendees using e-mail, audible instructions or voice mail.

14 Claims, 7 Drawing Sheets

|       | 9/29 MON. | 9/30 TUES. | 10/1 WED. | 10/2 THURS. | 10/3 FRI. | 10/4 SAT. | 10/5 SUN. |
|-------|-----------|------------|-----------|-------------|-----------|-----------|-----------|
| 8 AM  |           |            |           |             |           |           |           |
| 9 AM  | TONY PRESS 1# |        | XYZ CORP. 8# |          | DOCTOR 5# |           |           |
| 10 AM |           | ABC CORP. 3# |         |             | SALES 7#  |           |           |
| 11 AM |           |            | STAFF 6#  |             |           |           |           |
| 12 PM | BONNIE PRESS 2# |     |           | CLASS 4#    |           |           |           |
| 1 PM  |           |            |           |             |           |           |           |

TO VIEW NEXT WEEK PRESS    1*

TO VIEW PREVIOUS WEEK PRESS    2*

FIG. 6

APPARATUS AND METHOD FOR USING A TELEPHONE FOR REMOTE SCHEDULING

BACKGROUND OF THE INVENTION

1. Field of the Invention

The invention relates generally to electronic scheduling devices, and particularly, to an event scheduling system that permits a user to remotely access a calendar database using a telephone.

2. Description of the Related Art

One of the most difficult tasks in a modern work environment is scheduling meetings with employees who are frequently away from the office. Computer programs for scheduling meetings are available that allow users to schedule meetings based on electronic calendars stored for office employees. The program maintains a schedule for each individual, and provides schedule information to users who are planning meetings.

To schedule a meeting, a user simply keys in the names of prospective attendees and the desired meeting times. The computer program indicates whether the attendees are available, and if so, updates the attendees' schedules and alerts them to the meeting when they subsequently access the system. Alternatively, if the attendees are not available, the program allows the meeting planner to view the attendees' respective schedules to determine a more appropriate meeting time.

The prior art eases the scheduling burden by providing computers and software that allow individual schedules to be stored in various forms of electronic calendars. U.S. Pat. No. 4,626,836 discloses a computer system for storing schedules. In this system, schedule data can be accessed and visually scanned to determine meeting times. However, these activities require a computer terminal and keyboard.

An employee who is away from the office typically has limited use of the computer scheduling system, which can cause problems. For example, in situations where a traveling employee can not access the scheduling system, other users can inadvertently schedule meetings without giving her adequate notice.

Prior art techniques for remotely accessing computer-based scheduling systems generally require a portable computer with a modem or manual intervention from somebody located in the office. Using a portable computer is not always practical because not all locations have modem or network access. Moreover, proposed meetings are often the result of telephone conversations or voicemail messages. It would be more convenient to directly access a scheduling program from a telephone or from within a voicemail system.

U.S. Pat. No. 5,093,813 discloses an electronic scheduler that allows a caller using a telephone to remotely make appointments. The electronic scheduler can automatically select an appointment time for the caller to meet with a single individual, such as a doctor. However, the scheduler can not select a common meeting time for the caller and a plurality of other attendees. This drawback limits the usefulness of the scheduler in an office environment.

Thus, there is a need for a simple, user-friendly method and system that permits a person to remotely access a computer scheduling system using a telephone, whereby allowing the person to automatically schedule meetings with one or more individuals.

SUMMARY OF THE INVENTION

It is an advantage of the present invention to provide a scheduling apparatus and method that permits a remote user to schedule a meeting using a telephone. This allows a user having a telephone to access electronic calendars from a location away from the office. A further advantage of the present invention is that it provides an apparatus and method that can automatically compute a common meeting time from given a list of prospective attendees and then transmit the common meeting time over a telephone network.

The apparatus utilizes daily schedules of individuals that are stored in an electronic calendar. A user accesses the schedule information via a telephone by using a touch-tone signals or voice command. When scheduling a meeting, the user enters names of the desired attendees. A comparison is then made to ascertain times when all of the prospective attendees have no scheduled events. As a result of the comparison, a list of available times and dates for the proposed meeting is compiled. This list is then presented to the user either as a voice message, or alternatively, as a graphic display on a telephone having a graphic display. Once an appropriate date and time have been chosen from the list, a notification is distributed to the attendees of the scheduled meeting. The notification alerts the attendees as to the time, date and location and purpose of the meeting. The notification can be transmitted to the attendees via voicemail or e-mail. In addition, an attendee can query the electronic calendar to get information about scheduled meetings.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 6 illustrates an exemplary videophone graphical display of a weekly schedule.

DETAILED DESCRIPTION OF THE INVENTION

Figure 1:
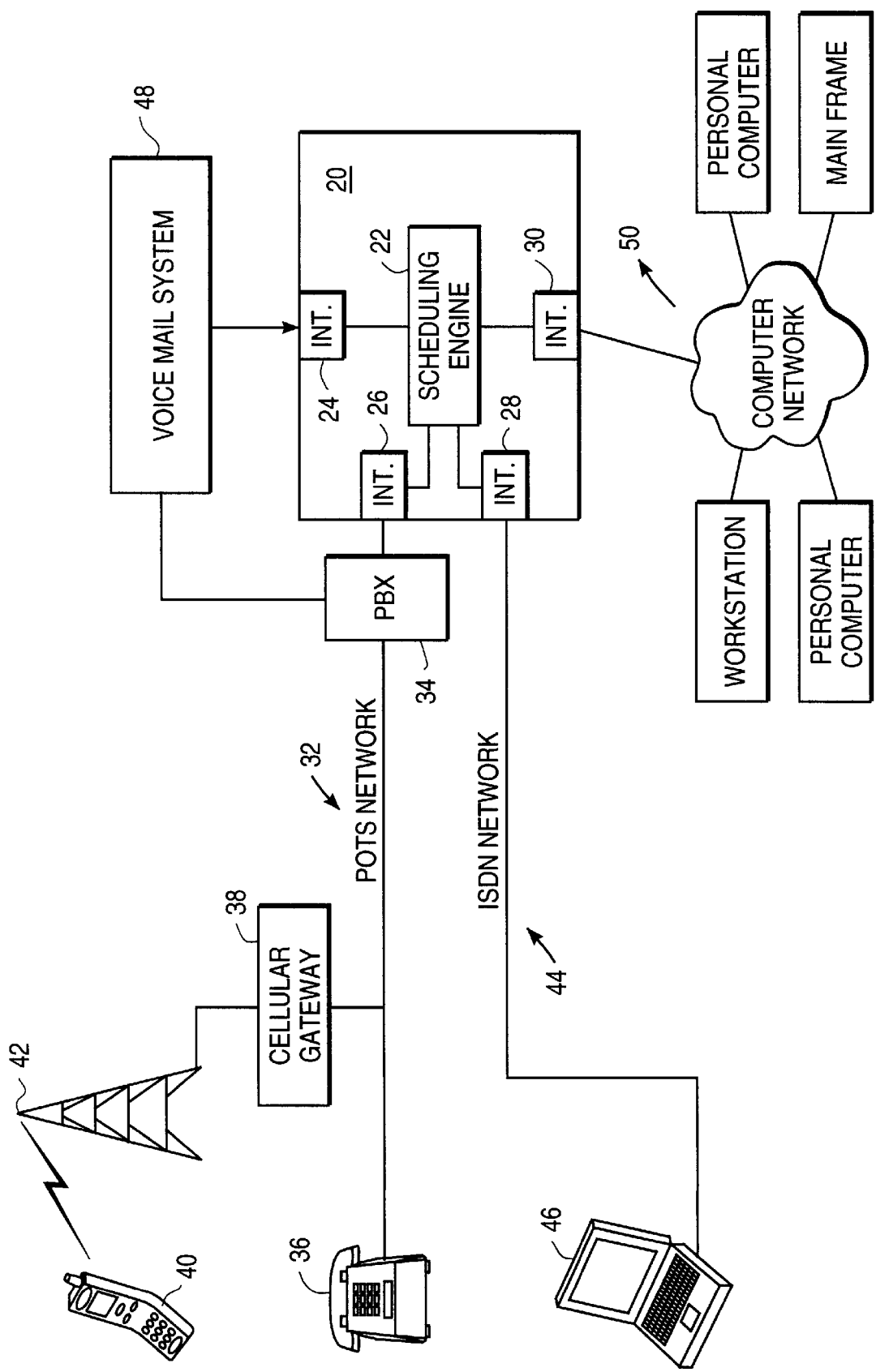
FIG. 1 is a block diagram illustrating a telephone system that incorporates an electronic scheduling device in accordance with the present invention.

Turning now to the drawings, and in particular to FIG. 1, a telephone system 10 is illustrated that includes a scheduling device 20 that is in accordance with an embodiment of the invention. The scheduling device 20 allows a user to access an electronic calendar database using a plain old telephone system (POTS) network 32, a voice mail system 48, a digital network 44, such as an Integrated Services Digital Network (ISDN) or a computer network 50. Using the POTS network 32, a user can directly access the scheduling device 20 with a conventional touch-tone telephone 36. The user can then check his own schedule or that of others using touch-tone signals, or alternatively, the user can schedule events and meetings.

The scheduling device 20 includes a scheduling engine 22, a voice mail interface 24, a POTS interface 26, a digital telephone interface 28 and a computer network interface 30. The scheduling engine 22 performs various scheduling and database access functions in response to user commanded received by the interfaces 24–30. The scheduling engine 22 can be implemented by a software program executing on a computer (not shown). Further details of the scheduling engine 22 are given in reference to FIGS. 2–3.

A user can access the scheduling device 20 from within a voice mail system 48. This provides convenience because a user, upon listening to his voice mail messages, can directly access the scheduling device 20 without having to exit the voicemail system 48. For example, while listening to a voicemail message from someone requesting a meeting, the user could interrupt the message playback and immediately schedule a meeting with the caller by entering, for example, "*68", where "*" interrupts the message playback, "6" deletes it, and "8" causes the voicemail system 48 to connect to the scheduling device 20. For this immediate scheduling function to work, both the caller and user should be internal users of the scheduling device 20. An internal user is a user having a personal schedule stored in the electronic calendar within the scheduling device 20.

The POTS interface 26 allows the scheduling device 20 to connect to the POTS network 32. In the example shown, the POTS interface is connected to a private branch exchange (PBX) 34. The PBX 34 can be implemented using currently available PBXs, such as the Siemens HICOM 300E communications server. In an alternative embodiment of the invention, the scheduling device 20 is incorporated as a component in the PBX 34.

In addition to using the conventional telephone 36, a user can access the scheduling device 20 using a cellular phone 40. The cellular phone 40 links to the POTS network 32 via a radio link 42 which, in turn, connects to a cellular gateway 38. The cellular gateway 38 connects to the POTS network 32.

The scheduling device 20 can respond to scheduling commands sent using the computer network 50. This permits users to access their schedules and plan meetings using scheduling software executing on a computer, or a common telephone. In addition to responding to computer commands, the scheduling device 20 can send schedule information and e-mail messages across the computer network 50 through interface 30. The e-mail messages can be used to alert prospective attendees of upcoming meetings and events.

Figure 2:
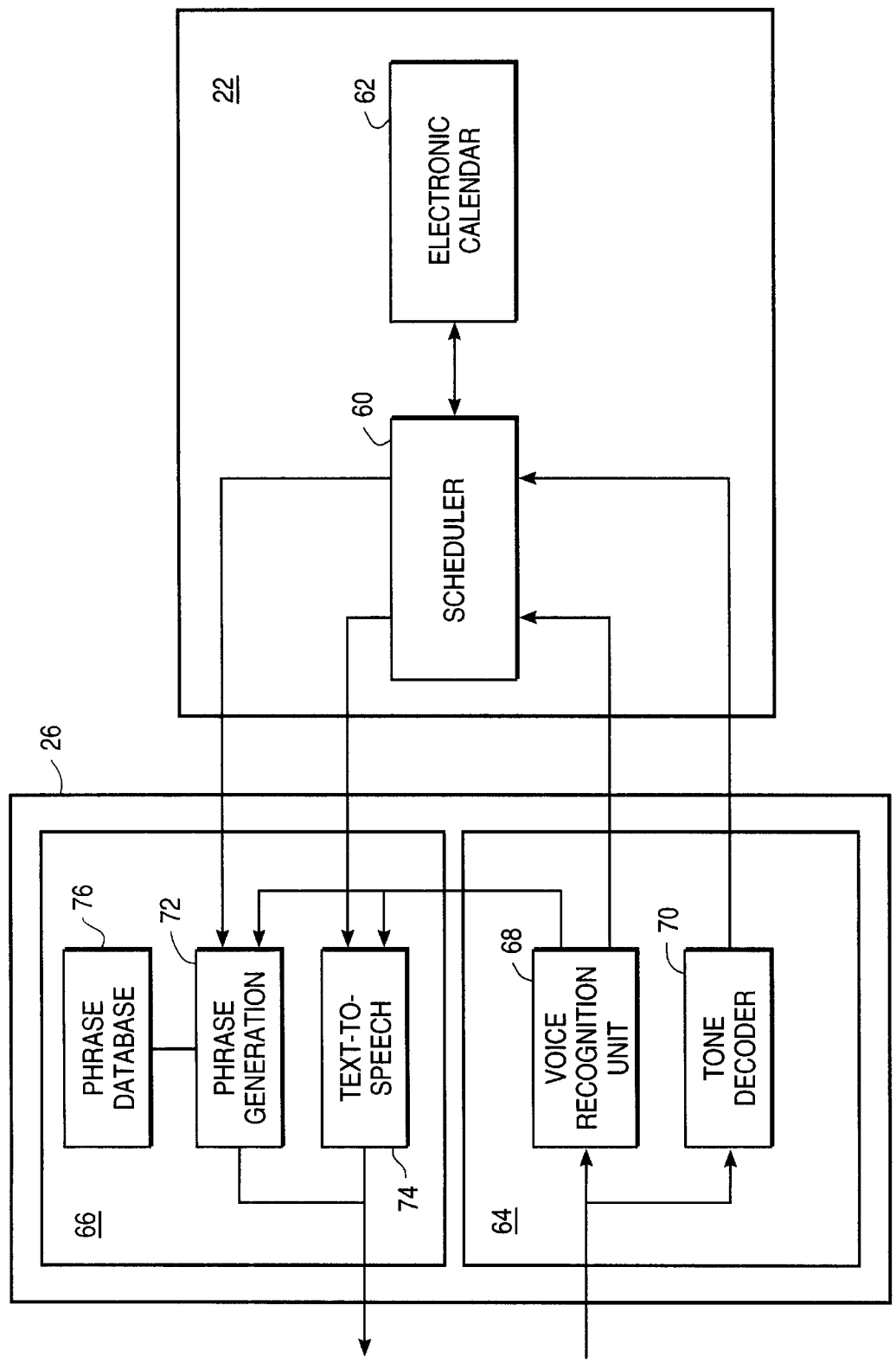
FIG. 2 is a detailed block diagram illustrating the electronic scheduling device and an exemplary interface shown in FIG. 1.

Turning now to FIG. 2, a detailed diagram of the scheduling engine 22 and the telephone interface 26 is illustrated. The scheduling engine 22 includes an electronic calendar 62 coupled to a scheduler 60. The telephone interface 26 includes an input interface 64 and an output interface 66. The input interface 64 converts user inputs received over the POTS network 32 into a digital format readable by the scheduler 60. In response to the user inputs, the scheduler 60 performs various scheduling and database access functions using information stored in the electronic calendar 62. As a result of these functions, the scheduler 60 generates output that is then converted to synthetic voice responses and transmitted over the POTS network 32 by the output interface 66.

The electronic calendar 62 is typically a computer database storing schedule information for internal users. The electronic calendar 62 includes a memory for storing the schedule information. The schedule information includes a plurality of individual schedules, each corresponding to an internal user. The schedules can be for various periods of time; for instance, each user can have a daily, weekly, or monthly schedule that is retrievable from the electronic calendar 62. Individual schedules can include times, dates, attendees and purposes of meetings. They can also include information as to whether attendees have confirmed or rejected scheduled meetings.

The input interface 64 can include a voice recognition unit 68 and a tone decoder 70. The voice recognition unit 68 can be a commercially available off-the-shelf voice recognition unit (VRU) used to identify voiced commands input by the user, such as PHONE QUERY™ from Dragon Systems, Inc. of Newton, Mass., or SPEECH WORKS from Al Tech of Boston, Mass. The tone decoder 70 converts touch-tone signals into digital signals. The tone decoder 70 can be implemented using standard components, such as the LMC567 tone decoder from National Semiconductor Corporation of Santa Clara, Calif.

The scheduler 60 accesses and updates schedule information stored in the electronic calendar 62 in response to user inputs received from the input interface 64. The scheduler 60 performs a number of functions. It allows a user to check her own schedule; it also allows her to schedule meetings. In addition, a user can check the schedules of others. The scheduler 60 can also compare schedules for various individuals in order to determine a common meeting time. The scheduler 60 can be a software routine executing on a computer processor.

The scheduler 60 outputs information to the output interface 66. Typically, this information is in a digital form. This digital information is converted into audio information, which is then transmitted to the user. To convert the digital information to audio, a phrase generator 72 and a text-to-speech converter 74 are used. The phrase generator 72 plays back stored phrases provided by the phrase database 76. The phrases are recalled in response to commands from the scheduler 60. These phrases typically include the names of attendees or users that are considered internal users. Typically, the phrase generator 74 produces a higher quality voice signal than the text-to-speech converter 72.

The text-to-speech converter 72 generates synthetic voice in response to digital commands. The text-to-speech converter 72 can be implemented using standard components, such as TruVoice text-to-speech from Centigram Communications Corporation of San Jose, Calif., or DECtalk from Digital Equipment Corporation of Massachusetts. The text-to-speech converter 72 is used to generate information that is not stored in the phrase database 76, such as users that are not internal to the scheduling device 20.

In addition to generating a synthetic voice based on scheduler output, the phrase generator 72 and the text-to-speech converter 74 can produce audio feedback representative of spoken commands of the user. This is useful for ensuring that the spoken commands of the user are correctly recognized by the VRU 68. To generate user feedback, the output of the VRU 68 is provided directly to the phrase generator 72 and the text-to-speech converter 74

Figure 3:
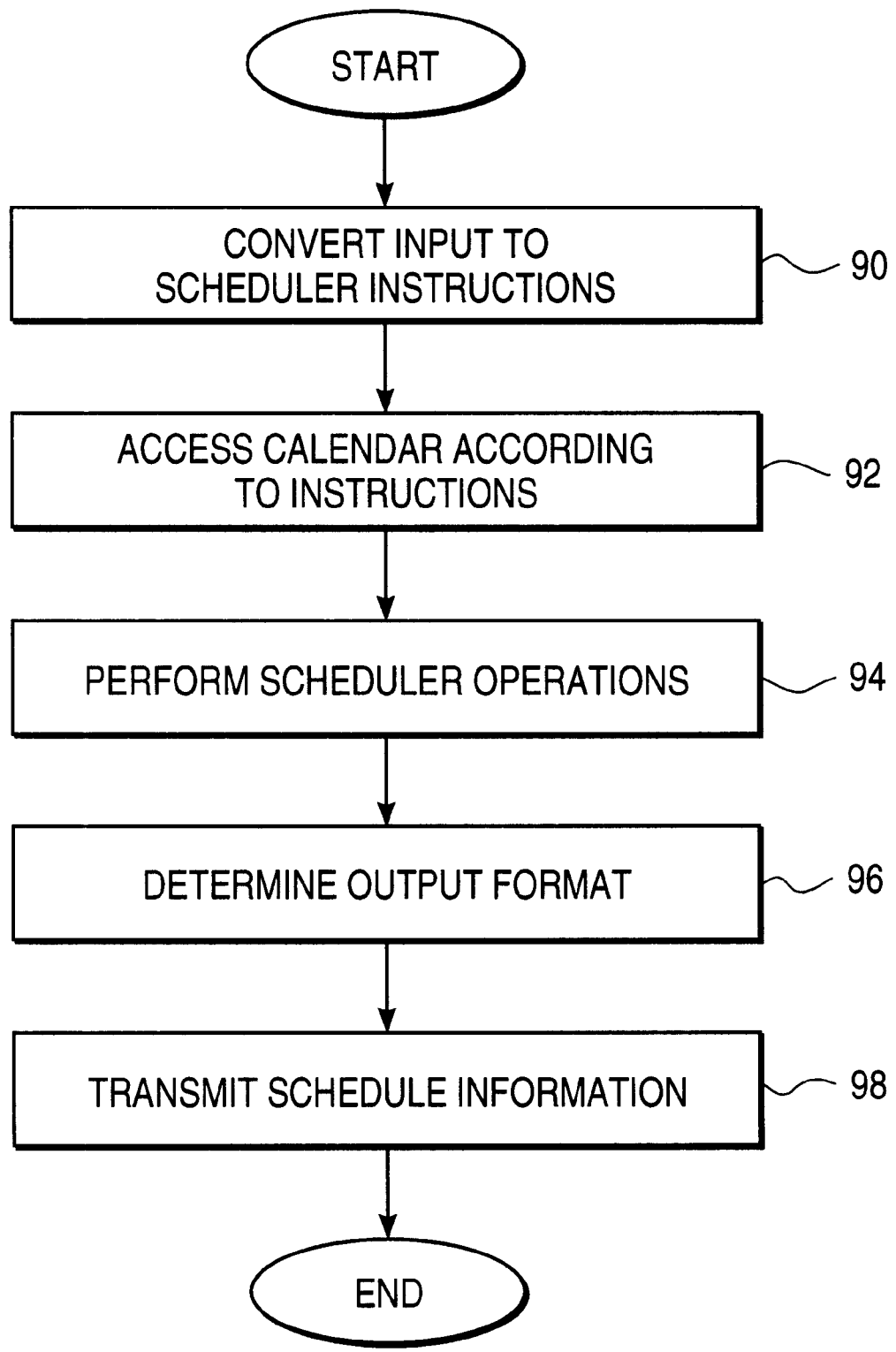
FIG. 3 illustrates a flow diagram of a method of accessing the electronic calendar shown in FIG. 1.

FIG. 3 shows a flow diagram of a method of using the scheduling device 20. In step 90, a user input is converted into a scheduler command. In step 92, the electronic calendar 62 is accessed by the scheduler 60 according to the command. In step 94, the scheduler 60 performs comparison or scheduling functions based on the command. These functions can include determining a common meeting time by comparing schedules to one another.

In step 96, the output transmission path for the schedule information is selected by the scheduler 60 based on user input. The transmission path can be through any of the interfaces 24–30 shown in FIG. 1. The selected interface(s) converts the scheduler output into the appropriate format. The format can include voice information for transfer over the POTS network 32, graphic and textual information for display on the digital telephone 46, computer data or e-mail for transfer over the computer network 50, or a voicemail message for the voicemail system 48. In step 98, the schedule information is transmitted via the interfaces 24–30 according to the user commands.

In addition to interfacing to the POTS network 32, the scheduling device 20 can be used with communications networks that provide combined voice, video and data services, such as an Integrated Services Digital Network (ISDN) 44 shown in FIG. 1. In response to user commands received over the ISDN network 44, the scheduling device 20 can generate graphical and textual representations of schedule information for visual display by the digital telephone 46.

To accomplish this, the digital telephone 46 can include a commonly available microcomputer, such as a hand-held PC, running an operating system that provides a graphical user interface (GUI), such as Windows CE from Microsoft Corporation or the Pen Pilot operating system from U.S. Robotics. A scheduling software application can set up the GUI for communicating with the scheduling device 20 by making function calls to the operating system. Essentially, the scheduling software can generate graphical menus displayable by the digital telephone 46, and it can also control ISDN data communications between the digital telephone 46 and scheduling device 20 in response to inputs from both the user and scheduling device 20. The digital telephone 46 can also include a software module, such as the ISDN Accelerator package from Microsoft Corporation, for interfacing the operating system to a commonly available ISDN network adapter, which can be included as a component in the digital telephone 46. Typically, the ISDN adapter includes software drivers.

The digital network interface 28 can include an ISDN network adapter and a software module for communicating between the ISDN adapter and the scheduling engine 22.

Figure 4:
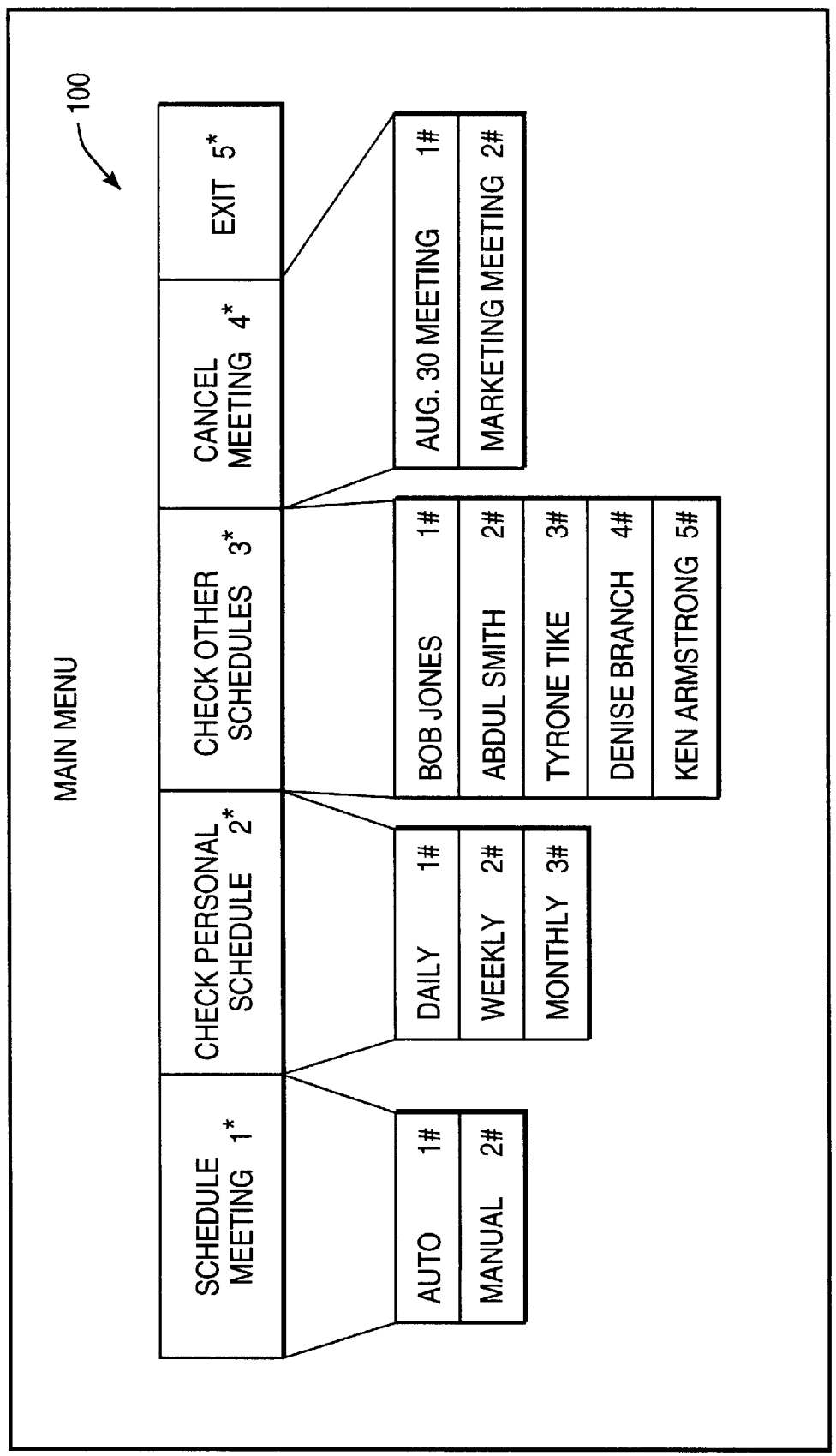
FIG. 4 illustrates an exemplary graphical user interface for use with the videophone shown in FIG. 1.

FIG. 4 shows an exemplary GUI 100 for display on the digital telephone 46. The GUI 100 includes the scheduling main menu. The main menu includes a pull-down menu for scheduling meetings, checking personal schedules or others schedules, cancelling meetings, and exiting the scheduling system. A user can respond to the pull-down menu by keying in numeric telephone numbers. These numbers are transmitted to the scheduling device 20 as conventional tone signals. For example, to schedule a meeting, a user would key into the digital telephone "1*". This would pull down a menu that allows a user to either automatically or manually schedule the meeting. To automatically schedule the meeting, the user would key in "1#". To manually schedule the meeting, the user would key in "2#". Manually scheduling a meeting permits the user to visually inspect the various schedules of the attendees. Whereas, automatically scheduling a meeting instructs the scheduler 60 to determine a common meeting time for all attendees.

The "check personal schedule" option would allow a user to check his daily, weekly or monthly schedule. The "check other schedules" would allow a user to view the schedules of other users included in the schedule database. A "cancel meeting button" would allow a user to cancel his attendance at a previously scheduled meetings. The "exit" button would allow a user to exit the system.

Figure 5:
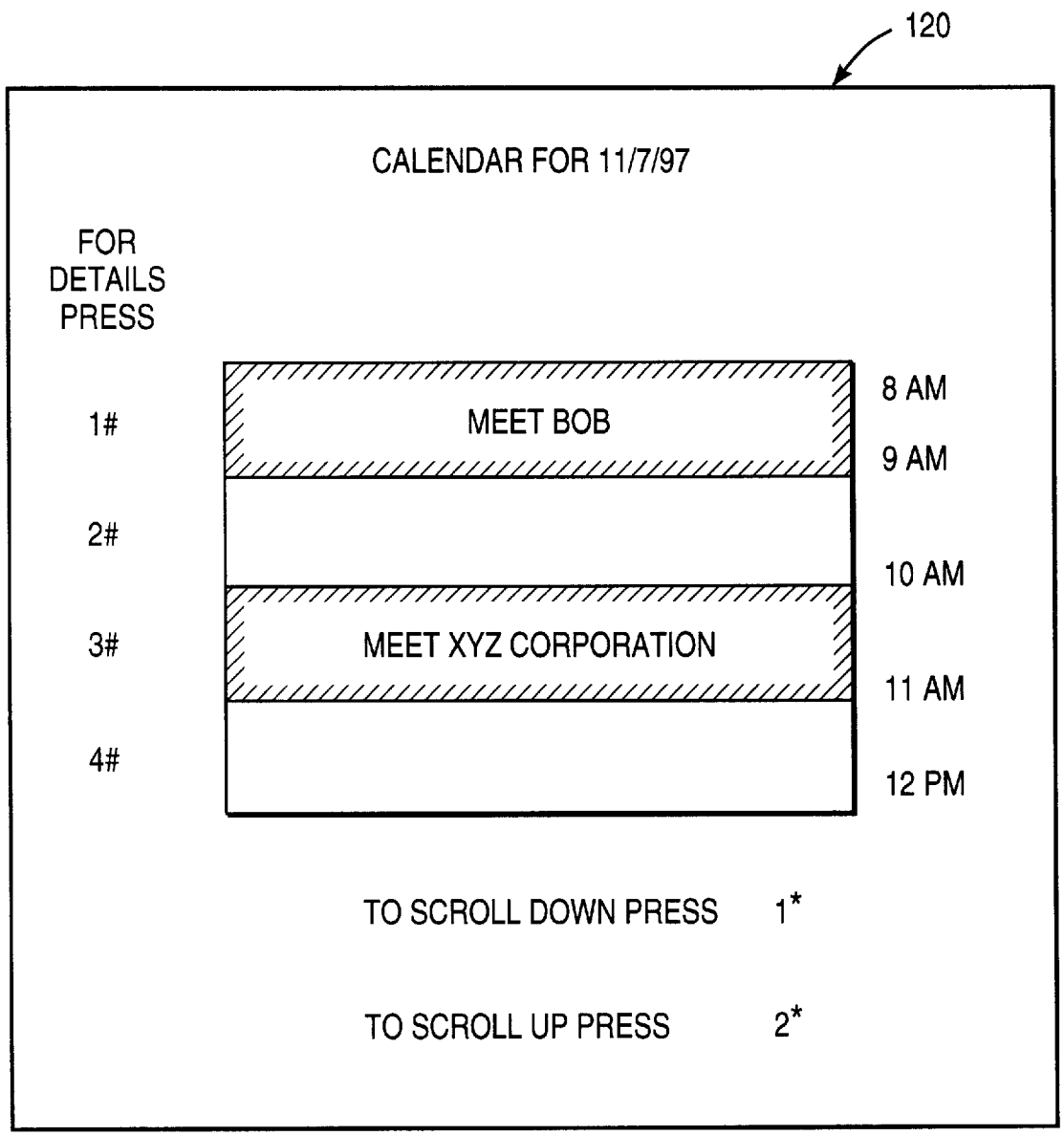
FIG. 5 illustrates an exemplary videophone graphical display of a daily schedule.

FIG. 5 displays an exemplary digital telephone GUI displaying the daily schedule of a hypothetical user. This display could be entered from the main menu 100 by selecting the "check personal schedule" option. The daily schedule is displayed according to the time scale shown on the right. The user can scroll up and down the time scale by pressing "1*" or "2*", respectively. Details of each meeting can be displayed by pressing the corresponding numeral followed by the pound sign, shown to the left of the screen. For example, to display details of the meeting with X, Y, Z Corporation, the user would press "3#".

FIG. 6 displays an exemplary digital telephone GUI 130 displaying a user's weekly schedule. Columns include days of the week, while the rows are arranged according to the time of the day. A user can scan forward and backward to the future and previous weeks by pressing a numeral followed by the star "*" key. Details of each meeting can be displayed by entering the number corresponding to the meeting followed by the pound sign.

Figure 7:
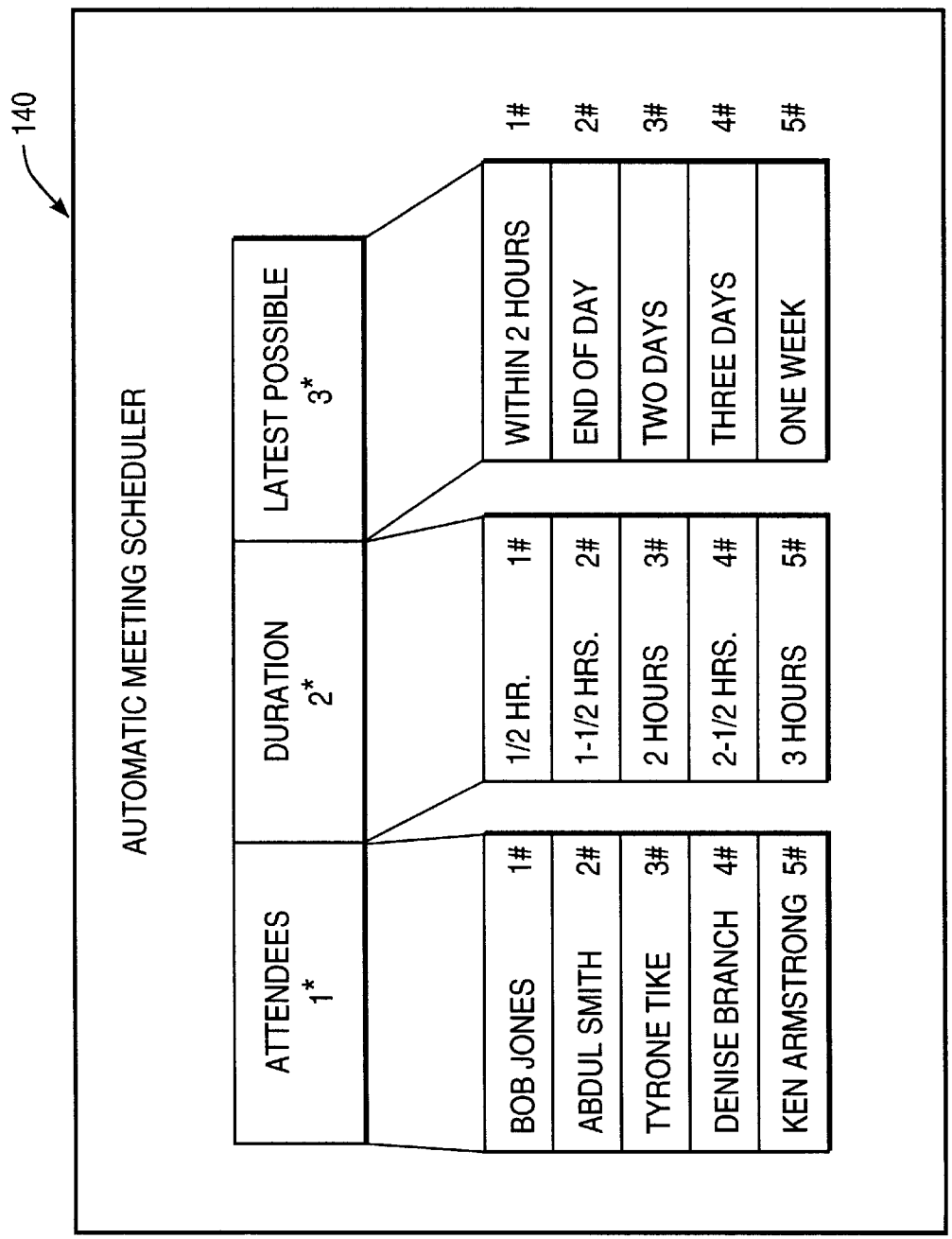
FIG. 7 illustrates an exemplary videophone graphical display of a control menu for scheduling a meeting.

FIG. 7 shows an exemplary GUI 140 displaying an automatic meeting scheduler. Scheduling GUI 140 can be display in response to selecting the "schedule meeting" option of the main menu GUI 100.

The top bar of scheduling GUI 140 includes buttons for listing attendees, scheduling the duration of the meeting, and scheduling the latest possible date for the meeting. By selecting the attendees button, a user can key in the desired attendees by selecting the corresponding number followed by the pound sign. The duration can be selected by keying in the appropriate number corresponding to the desired length. The latest possible date or time of the meeting constrains the scheduler 60 in its selection of possible meeting times. For example, if the user wants to schedule a meeting within two hours, he presses "1*". In response, the scheduler 60 will search only schedule information pertaining to upcoming two hours of the selected attendees' schedules. This constrained search is similarly carried out for the other possible selections provided by the automatic scheduling GUI 140.

While specific embodiments of the present invention have been shown and described, it will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A system for enabling a user to remotely access an electronic calendar using a digital telephone, comprising:
   an input interface configured to respond to a telephone network;
   an electronic calendar configured to store a plurality of schedules;
   a scheduler configured to access the plurality of schedules as a function of an output from the input interface;
   an output interface configured to transmit to the telephone network one or more output signals representative of textual information displayable on the digital telephone, wherein the textual information is derived from the stored schedules.

2. The system of claim 1, wherein the output signals are representative of graphical information displayable on the digital telephone, the graphical information being derived from the stored schedules.

3. The system of claim 2, wherein the graphical information represents a pull-down menu displayable on the digital telephone.

4. The system of claim 3 wherein said pull-down menu includes an option to cancel a previously scheduled meeting.

5. The system of claim 3 wherein said pull-down menu includes an option to check the personal schedule of said user.

6. The system of claim 3 wherein said pull-down menu includes an option to check the schedule of others besides said user.

7. The system of claim 3 wherein said digital telephone comprises a computer or hand-held PC.

8. The system of claim 3 wherein said digital telephone comprises a cellular phone.

9. The system of claim 2 wherein said digital telephone comprises a computer or hand-held PC.

10. The system of claim 2 wherein said digital telephone comprises a cellular phone.

11. The system of claim 1, wherein the scheduler compares the schedules to one another to determine a common meeting time in response to the output from the input interface.

12. The system of claim 1, wherein the input interface is responsive to an ISDN signal.

13. The system of claim 1 wherein said digital telephone comprises a computer or hand-held PC.

14. The system of claim 1 wherein said digital telephone comprises a cellular phone.

* * * * *